UNITED STATES PATENT OFFICE.

CHARLES H. O'CONNOR, OF BROOKLYN, NEW YORK.

MANUFACTURE OF NON-INFLAMMABLE PAPER.

SPECIFICATION forming part of Letters Patent No. 225,858, dated March 23, 1880.

Application filed September 8, 1879.

*To all whom it may concern:*

Be it known that I, CHARLES HENRY O'CONNOR, of Brooklyn, in the county of Kings and State of New York, have invented a new and useful Improvement in the Manufacture of Non-Inflammable Paper, of which the following is a specification.

The object of my invention is to furnish a heavy, flexible, and non-inflammable paper adapted for use as sheathing or deadening in building and for other purposes.

For building purposes it is especially important that the paper be flexible, so as to admit of its being put up for sale in rolls, in which shape it is most economical and convenient for use; and it is also necessary that the paper be comparatively inexpensive.

These features have not heretofore been attained in non-inflammable paper by any of the various means that have been used to render paper to a greater or less extent non-inflammable or fire-proof.

One method has been to coat the paper with a solution of silicate of soda; but by such process the material is rendered inflexible, and, being only coated, is liable to crack and expose the interior unprotected portions, so that while silicate of soda is capable of rendering materials such as paper non-inflammable, it has not been availed of to any extent, on account of the difficulties named, and for the further reason that it is difficult to saturate even unsized paper with commercial silicate of soda, which has a specific gravity of about 1.370 at 62° Fahrenheit.

I have discovered that by using a solution of silicate of soda of light specific gravity paper partially sized or unsized can be saturated by the process hereinafter described, so that a cheap, flexible, and non-inflammable paper is produced, and in such process and material my invention consists.

The process of manufacture is as follows: I make use of heavy paper of the character generally used for building purposes, either wholly unsized or exteriorly unsized, and a solution of silicate of soda of a specific gravity from 1.100 to 1.250 at 62° Fahrenheit. The saturation is accomplished by passing the paper in rolls or sheets, by any mechanical apparatus, through the solution described, after which the paper is to be passed between pressure-rollers to express the liquid solution not absorbed by the paper, the surplus liquid being saved for further use. The paper may then be dried by passing it over heated rollers, by exposing it to heated air, or to air at an ordinary temperature.

The process described may be advantageously accomplished on the paper-machine as part of the manufacture of the paper. The saturation in that case should take place after the paper has passed through the press-rolls, the saturated paper then passing between the rollers for removing the surplus solution, and from thence over the driers of the paper-machine.

The paper produced in this manner has the special characteristics of flexibility and non-inflammability, which render it valuable as a material for sheathing and deadening purposes in buildings and for other purposes.

The removal of the surplus silicate of soda from the saturated paper is an essential part of the process in respect to the expense of manufacture, and the use of a solution of low specific gravity, in addition to rendering the saturation complete, reduces the expense of drying the paper, as the drying of paper coated or saturated with a solution of high specific gravity is expensive on account of the adhesive character of such solution.

Having thus described my invention, I claim as new and desire to secure by Letters Patent—

1. The herein-described process for the manufacture of flexible non-inflammable paper, or for the treatment of paper to render it non-inflammable—that is to say, saturating paper wholly or partially unsized with a solution of silicate of soda of low specific gravity, and subsequently drying the paper, substantially as described.

2. The herein-described process for the manufacture of flexible non-inflammable paper—that is to say, saturating by immersion paper wholly unsized, or with its exterior unsized, with a solution of silicate of soda of a specific gravity not greater than 1.250 at 62° Fahrenheit, removing the surplus solution by pressure, and drying the paper, substantially as described.

3. An improved building-paper impregnated with silicate of soda and having the characteristics of flexibility and non-inflammability, as specified.

CHARLES H. O'CONNOR.

Witnesses:
GEO. D. WALKER,
C. SEDGWICK.